United States Patent [19]

Knudsen

[11] 4,098,935

[45] Jul. 4, 1978

[54] MAGNETIC IDENTIFICATION LABEL TAPE AND METHOD

[75] Inventor: James K. Knudsen, Woodbury Township, Washington County, Minn.

[73] Assignee: Minnesota Mining and Manufacturing Company, St. Paul, Minn.

[21] Appl. No.: 611,235

[22] Filed: Sep. 8, 1975

[51] Int. Cl.² .............................................. C09J 7/02
[52] U.S. Cl. ....................................... 428/40; 427/54; 427/131; 427/177; 427/207 D; 427/208; 428/195; 428/213; 428/219; 428/352; 428/353; 428/354; 428/474; 428/900; 428/910
[58] Field of Search ......................... 478/343, 354, 40; 427/207, 208, 127–132, 54, 177; 428/195, 213, 219, 353, 352, 474, 900, 910

[56] References Cited

U.S. PATENT DOCUMENTS

| | | | |
|---|---|---|---|
| 2,912,344 | 11/1959 | Newman et al. | 428/354 X |
| 2,920,674 | 1/1960 | Bull | 152/361 |
| 2,964,422 | 12/1960 | Bergstedt et al. | 477/207 X |
| 2,984,596 | 5/1961 | Franer | 154/95 |
| 3,225,810 | 12/1965 | Enabnit | 152/330 |
| 3,750,120 | 7/1973 | McCarty | 152/330 X |
| 3,788,879 | 1/1974 | Waysman | 428/354 X |
| 3,821,060 | 6/1974 | Braca et al. | 161/39 |
| 4,010,354 | 3/1977 | Apicella et al. | 235/61.6 R |

*Primary Examiner*—Bernard D. Pianalto
*Attorney, Agent, or Firm*—Cruzan Alexander; Donald M. Sell; William B. Barte

[57] ABSTRACT

A label tape suitable for application to vulcanizable articles such as vehicle tires is disclosed. This tape includes a carrier web and a plurality of removable labels, each label comprising a backing, a pressure sensitive adhesive layer on one surface of the backing and a magnetic recording layer on the other surface of the backing. In a desired application, each label is magnetically encoded prior to being affixed via the adhesive layer to an unvulcanized tire carcass. During vulcanization the label becomes permanently affixed to the tire without altering the magnetically encoded information. The tire may subsequently be moved past a magnetic play-back head to produce a signal corresponding to the magnetically encoded information to thereby provide information indicative of the specific tire.

16 Claims, 1 Drawing Figure

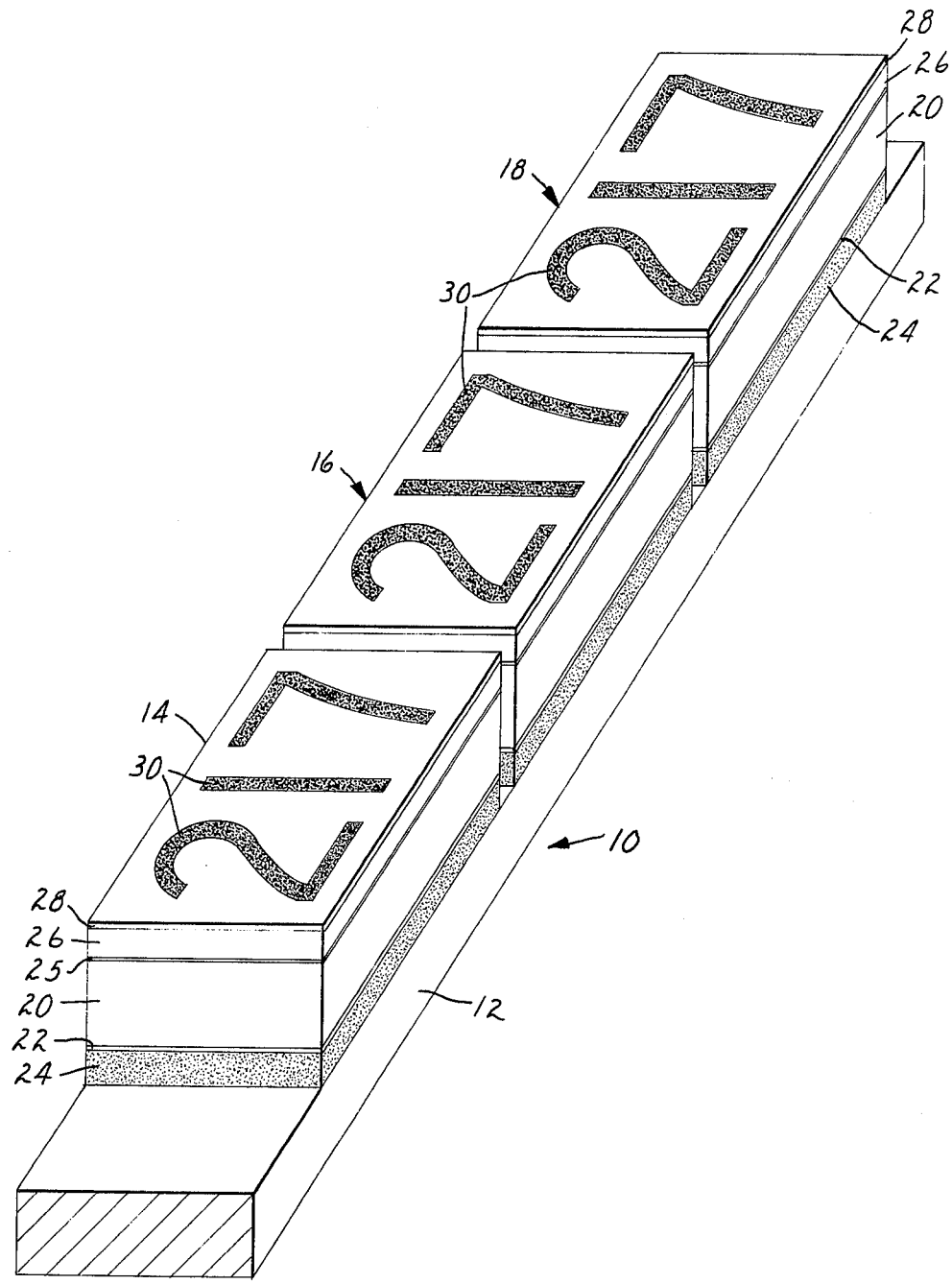

MAGNETIC IDENTIFICATION LABEL TAPE AND METHOD

BACKGROUND OF THE INVENTION

(1) Field of the Invention

This invention relates to a label tape, suitable for application to vulcanizable articles to provide identification of said articles after vulcanization has been completed.

(2) Description of the Prior Art

Various techniques for identifying vulcanized articles such as vehicle tires have previously been disclosed. U.S. Pat. No. 2,984,596 (Franer) discloses a label tape providing visible indicia capable of being applied to a vehicle tire prior to vulcanization. In addition to such visible methods, magnetic identification methods have been long sought. For example, in U.S. Pat. Nos. 2,920,674 (Bull) and 3,460,119 (Ugo et al.), systems are disclosed in which the bead wires conventionally present in vehicle tires are selectively magnetized to provide an identification code. In U.S. Pat. Nos. 3,225,810 (Enabnit) and 3,233,645 (Newell), articles are disclosed wherein discrete blocks of a permanent magnet material such as barium ferrite are selectively positioned within the tire to provide an identification code. Since the discrete blocks must be positioned prior to vulcanization, the recorded information cannot be changed subsequent to vulcanization.

U.S. Pat. No. 3,750,120 (McCarty) discloses an identification system wherein a magnetic pigment such as magnetite is uniformly dispersed throughout a portion of the article such as a band on the sidewall of the tire. While this system overcomes several limitations inherent in the above discussed systems, the special compounding and other problems limit the applicability of such a system.

SUMMARY OF THE INVENTION

In contrast to the prior art systems discussed hereinabove, the present invention provides a tape suitable for labeling vulcanizable articles such as vehicle tires with firmly attached, magnetically encodeable and readable labels. These labels may be both printed with visible identifying indicia and magnetically encoded prior to the application thereof to an unvulcanized article. During the vulcanization process, the labels become permanently affixed to the article, and thereafter the indicia may be read and the magnetic code may be detected, erased and/or altered by conventional magnetic recording techniques. The tape is capable of being wound upon itself in roll form for storage and transport and of being unwound in condition for printing, magnetic encoding and/or application. Because of the severity of the vulcanization conditions and of the desire to read out the magnetic record after vulcanization, it is important that the labels have a high degree of structural integrity and that they become firmly bonded to the article during vulcanization.

The tape of the present invention comprises a flexible temporary disposable carrier web having a low-adhesion surface and adhered thereto a detachable label structure capable of withstanding vulcanization conditions. Each label comprises a backing, a pressure sensitive adhesive layer permanently adhered to one surface of the backing and a magnetic recording layer secured to the other surface of the backing. The pressure sensitive adhesive layer enables the tag to be secured to the article prior to vulcanization and releasably adhered to the low adhesive surface of the carrier web. The magnetic recording layer has a substantially uniform thickness less than 50 micrometers, comprises a major proportion of magnetizable particles and a minor proportion of a polymeric binder, and has a remanent flux of at least 0.4 maxwells per cm of width.

The backing is flexible, non-porous and has a substantially uniform thickness within the range of 10 to 100 micrometers. It withstands vulcanization temperatures and pressures during molding operations without appreciable dimensional change so as to protect the magnetic recording layer from any appreciable physical movement. To this end the backing should not melt or decompose at 200° C. In order that the labels are sufficiently stiff so as to minimize handling difficulties prior to application to the article to be vulcanized, it is desirable that the backing have a modulus of elasticity of at least $5 \times 10^{10}$ dynes/cm$^2$. The pressure sensitive adhesive layer is substantially uniformly thick and has a dry coating weight within the range of 6 and 45 grams/meter$^2$. Such a layer preferably comprises a vulcanizable rubber and tackifying resin. The adhesive layer may be strongly anchored to the backing by means of a substantially uniformly thick layer of adhesion promoting primer, ranging in thickness between 0.1 and 3 grams/meter$^2$.

In order to provide a readily printable surface on which indicia characteristic of an intended use of the label may be printed, an outer protective layer is desirably applied over the recording layer. The protective layer is preferably provided by a resin that separates readily from tire molds at the conclusion of the vulcanizing process.

BRIEF DESCRIPTION OF THE DRAWING

The FIGURE is a cross-section of a label tape constructed pursuant the present invention.

DESCRIPTION OF THE PREFERRED EMBODIMENTS

The FIGURE shows a cross-section of a length of label tape of the present invention, in which a tape 10 may be seen to comprise a release liner 12 which is continuous over the length of tape 10 and a series of labels 14, 16 and 18 respectively. Each of the labels comprise a number of layers secured to a central backing 20. Between the backing 20 and the release liner 12 is a layer of adhesive primer 22 and a layer of pressure sensitive adhesive 24. The opposite side of the backing is provided with a primed surface 25, a layer of magnetic recording material 26 and a protective outer layer 28 on which indicia 30 may be printed.

The tape depicted in the FIGURE is preferably constructed of a number of continuous coatings applied to a large web on a suitable backing material, after which the discrete labels 14, 16 and 18 are die-cut, the waste material between adjacent labels removed and the web slit into tape form.

In a preferred embodiment, the labels are designed to be affixed to tire carcasses prior to vulcanization. Accordingly, the backing 20 is selected to withstand conditions present during the molding process. A particularly desirable backing has been found to be biaxially oriented polyester having an uniform thickness in the range between 10 and 100 micrometers. Even though the second order or glass transition temperature of such a material is well below the temperatures encountered during vulcanization, the labels have been found to be intact and firmly and permanently adhered to the tires after vulcanization. Alternatively, backings formed of polymers having high glass transition temperatures such as polyimides have also been found to be suitable, but the initial cost is greater, and properties superior to polyethylene terephthalate are not required In some applications, paper and cellulose acetate backings may also be used. Backings of non-magnetic metals should also be useful. Backings which will withstand the vulcanization temperatures and pressures without appreciable stretching or other dimensional change such that the magnetic recording layer is preserved intact are generally required. For example, backings which will not melt or decompose at 200° C are required for general tire vulcanization applications. Because of the indeterminateness of conditions actually present during vulcanization, the suitability of a given backing is best determined during in-situ testing. In order to facilitate handling of the label prior to application on a vulcanized article, it has further been found desirable that the backing have a modulus of at least $5 \times 10^{10}$ dynes/cm$^2$. Backings having a lower modulus will generally be so limp as to require special handling techniques or undue thicknesses. An upper thickness of 100 micrometers provides a backing which is sufficiently strong to support the magnetic layer while minimizing the physical interference with the article to which it is to be attached. Backings having a surface roughness of less than 0.25 micrometer are desirable since the surface roughness of the magnetic recording layer applied to the backing is dependent thereon. A smooth magnetic layer minimizes signal "dropouts" when a magnetic recording or playback head is passed along the surface of a label.

In making a label tape of the present invention, a thus selected backing is coated with the magnetic recording layer on one surface and a pressure sensitive adhesive layer on the other. While the sequence of which surface is first coated is somewhat arbitrary, it is convenient to describe first the application of the pressure sensitive adhesive layer.

In order to ensure that the pressure sensitive adhesive layer 24 be firmly adhered to the backing and thereby prevent the backing from separating from the adhesive and shifting in position during vulcanization, it is desirable to coat the backing with an adhesion promoting primer. A variety of such primers are known to those skilled in the art and must be selected to be compatible with both the backing and the adhesive to be applied. For a polyester backing and an adhesive layer compatible with rubber articles, i.e., such as a latex crepe, a suitable primer layer may be formed by applying a dilute solution of crude rubber in heptane, thereafter evaporating the solvent and exposing the layer to UV radiation in order to improve the bond of the primer to the backing.

After the primer layer has been formed, the pressure sensitive layer is applied thereto via conventional coating techniques, typically using solvent based systems.

After oven drying to remove the solvent, the adhesive surface is pressed against a carrier web having a low adhesion surface such as a silicone coated paper. The carrier web is desirably selected to be sufficiently stiff so as to support the layers during subsequent die-cutting operations.

While in the above description, the pressure sensitive adhesive layer was described as being applied to a primed surface of the backing, it is also within the scope of the present invention to coat the adhesive onto the carrier web, dry it, and thereafter to press the dried adhesive layer against the primed backing.

Following the application of the pressure sensitive adhesive layer and carrier web to the backing, the opposite surface of the backing is then coated with a dispersion of a magnetizable material in binder, solvents, etc., magnetically aligned, and dried to provide the magnetic recording layer. As is well known to those skilled in magnetic recording formulations, any of a wide variety of magnetic materials, binders, etc. may be selected of materials which will withstand vulcanization conditions.

A protective top coat over the magnetic recording layer is thereafter desirably applied so as to improve the resistance of the recording layer to abrasion, to provide a more ink receptive surface, to protect the binder from oxidation and to prevent transfer of material to the mold during vulcanization.

An example of a preferred construction of a label tape according to the present invention is as follows:

EXAMPLE

A web of biaxially oriented polyethylene terephthlate film 3 mils thick (75 micrometers) was selected. Such films are particularly useful over the range of 40 to 100 micrometers; films of less thickness may be so flexible and limp as to require special handling.

A dilute (2.5%) solution of crude rubber in heptane was coated onto the backing to provide an extremely thin adhesive promoting layer, such as approximately 1.0 grams/meter$^2$ dried coating weight. After applying the solution to the backing, the coating was dried by heating to approximately 100° C and thereafter exposed to high intensity UV. The latter step is desired so as to enhance the bonding of the primer layer to the backing.

A pressure sensitive adhesive was provided by a solution of 80% heptane and 20% of the following ingredients:

100 parts of latex crepe
75 parts of pure hydrocarbon thermoplastic terpene resin melting at approximately 115° C and having a zero acid number (such as Piccolyte S-115, manufactured by Hercules, Inc.)
1 part of an anti-oxidant (i.e., 2,5-ditertiaryamylhydroquinone) or "Santovar A", manufactured by Monsanto Chemical Co.
1 part of a vulcanization accelerator, i.e., cyclohexylamine This solution was applied and oven-dried, thereby forming a pressure sensitive adhesive layer having a dry coating weight of 6 grains per 24 square inches (25 grams/meter$^2$). A carrier web, i.e., a silicone-coated kraft-glassine 60 pounds/ream (3000 ft$^2$) release paper (100 gm/meter$^2$) was then pressed against the adhesive surface.

The magnetic recording layer was made from the following dispersion of acicular gamma-$Fe_2O_3$ particles:

| | |
|---|---|
| methyl ethyl ketone (MEK) | 4560 gm |
| Toluene | 3660 gm |
| Surfactant (a phosphorylated ethoxylated long chain alcohol) | 272 gm |
| gamma-$Fe_2O_3$ | 5440 gm |

| -continued | |
|---|---|
| 25% solids solution of a high molecular weight polyester polyurethane polymer synthesized from neopentyl glycol, poly-epsilon-caprolactone diol and p,p'-diphenyl methane diisocyanate dissolved in MEK | 2980 gm |
| 30% solids solution in MEK of Phenoxy PKHH resin, manufactured by Union Carbide | 1050 gm |
| Carbon black (Vulcan XC-72, manufactured by Cabot Corp.) | 440 gm |

After ball milling the dispersion until smooth and filtering it through a 7–8 micrometer filter, one percent of a suitable cross-linking agent, i.e., "PAPI" sold by the Polychemical Division of UpJohn Co., which is polymethylene polyphenyl isocyanate having on the average 3.2 groups per molecule, was mixed into the dispersion. The dispersion was coated by conventional magnetic recording media manufacturing procedures onto the backing which had previously been primed to promote adhesion of the magnetic coating. Such a primer was formed by drying a dilute solution of parachorophenol in MEK. The wet coating was subjected to a magnetic field to align the iron oxide particles in longitudinal direction and then dried in an oven to a dried thickness of approximately 20 micrometers.

A 2.5 micrometer thick protective printable top layer was obtained by topcoating the magnetic recording layer with a 10% solution of two parts of "Phenoxy PKHH" and one part of "PAPI" cross-linking agent in a mixture of 59 parts of MEK and 41 parts of toluene. The solvents were thereafter removed by drying.

Such an overcoated product was found to be readily printed upon. The product was printed via flexographic press using an ink such as that manufactured by Consolidated Printing Ink Co., type "Flexo Silver FA-10770." The product was then die-cut in a conventional manner and the waste between adjacent labels stripped off. The resultant labels were 3.6 cm long by 8.25 cm wide. Tape containing strips of labels were then formed by slitting the carrier web to a width of 0.5 inch (1.27 cm), thereby reducing the labels to 3.6 cm long by 1.27 cm wide.

The resultant tapes and labels were successfully employed in a tire identification system in which the labels while still on the backing were passed through a special dispenser apparatus in which a magnetic code was recorded thereon and the release liner removed. Thus dispensed labels were then applied to the sidewalls of tire carcasses prior to insertion into the vulcanization molds. After vulcanization, the labels were securely bonded to the sidewalls. Upon passing the labeled portion of the sidewalls past a magnetic pickup head, the encoded information was readily detected. Good signal-to-noise ratios were observed even with head spacings from the sidewalls of up to 5 mils (125 micrometers), such as may arise from the use of blemish paint, mold release paint or other debris adhering to the tire.

Such a preferred product was also found not to transfer any visible material onto the tire mold and to resist staining of the label due to black blemish paint often applied to the tire carcass prior to molding.

Having thus described the present invention, what is claimed is:

1. A tape for labeling vulcanizable rubber articles such as vehicle tires, said tape comprising a flexible temporary carrier web having a low-adhesion surface and a detachable label adhered thereto, which label comprises (a) a flexible, non-porous substantially uniformly thick backing of polyimide or biaxially oriented polyester which has a thickness within the range of 10 to 100 micrometers, and which will during molding operations withstand vulcanization temperatures and pressure without appreciable dimensional change, (b) an adhesion promoting primer of substantially uniform thickness on one surface of the backing, said primer having a dry coating weight within the range of 0.1 to 3 grams/meter$^2$, (c) a substantially uniformly thick layer of pressure sensitive adhesive, the dry coating weight of which is within the range of 6 to 45 grams/meter$^2$, permanently adhered via the adhesion promoting primer to one surface of said backing and releasably adhered to said low-adhesion surface of said carrier web, and (d) a substantially uniformly thick magnetic recording layer secured to the other surface of the backing, which recording layer is less than 50 micrometers thick, comprises a major proportion by weight of magnetizable particles and a minor proportion of a polymeric binder and has a remanent flux of at least 0.4 maxwells per cm of width, the characteristics of said label enabling a magnetic code to be recorded thereon prior to the application thereof to a said vulcanizable rubber article such that it becomes securely bonded to the article during vulcanization, and further enabling the recorded magnetic code to be readily detected after vulcanization.

2. A tape according to claim 1, wherein said pressure sensitive adhesive comprises a vulcanizable rubber and a tackifying resin.

3. A tape according to claim 1, wherein said label further comprises a polymeric protective coating over the magnetic recording layer having a thickness in the range of 0.5 to 5.0 micrometers, said protective coating adapted to provide a readily printable surface readily removable from molds at the conclusion of vulcanization.

4. A tape according to claim 3, wherein said protective coating comprises a tough thermoset polymer.

5. A tape according to claim 1, wherein said label is provided with printed indicia indicative of an intended use therefor.

6. As an article of manufacture, a rubber article having a surface to which is permanently affixed for marking purposes a label structure which was vulcanized in a mold together with the rubber article, said label structure prior to vulcanization comprising (a) a flexible, non-porous substantially uniformly thick backing of polyimide or biaxially oriented polyester which has a thickness within the range of 10 to 100 micrometers, and which will withstand vulcanization temperatures and pressures without appreciable dimensional change, (b) an adhesion promoting primer of substantially uniform thickness on one surface of the backing, said primer having a dry coating weight within the range of 0.1 to 3 grams/meter$^2$, (c) a substantially uniformly thick layer of a pressure sensitive adhesive, the dry coating weight of which is within the range of 6 to 45 grams/meter$^2$, permanently adhered via said adhesion promoting primer to one surface of said backing, and (d) a substantially uniformly thick, magnetic recording layer secured to the other side of the backing, which recording layer is less than 50 micrometers thick, which comprises a major proportion by weight of magnetizable particles and a minor proportion of a polymeric binder and which has a remanent flux of at least 0.4 maxwells per cm of width, said label structure being adapted to have a magnetic code recorded thereon prior to the application thereof to a vulcanizable rubber article whereupon the label structure and article structure being further adapted to enable the recorded magnetic code to be readily detected after vulcanization.

7. As an article of manufacture according to claim 6, further comprising a polymeric protective coating over the magnetic recording layer, having a thickness of 0.5 to 5.0 micrometers.

8. As an article of manufacture according to claim 7, wherein said protective coating comprises a tough thermoset polymer.

9. As an article of manufacture according to claim 6, wherein said pressure sensitive adhesive prior to vulcanization comprises a vulcanizable rubber and a tackifying resin.

10. The method of making a roll of label tape suitable for providing vulcanizable rubber articles with labels which are adapted for being unwound from roll form in condition for printing, a magnetic code recorded thereon and applied to vulcanizable rubber articles, whereupon during vulcanization the label becomes securely bonded to the article and subsequent to said vulcanization the recorded magnetic code may readily be detected, said method comprising the steps of
(a) providing a flexible, non-porous substantially uniformly thick backing of polyimide or biaxially oriented polyester which has a thickness within the range of 10 to 100 micrometers, and which will withstand the vulcanization temperatures and pressures present during molding operations without appreciable dimensional change,
(b) applying to one surface of said backing a substantially uniform layer of adhesion promoting primer to provide a dry thickness thereof ranging in thickness between 0.1 and 3 grams/meter$^2$,
(c) providing a flexible temporary carrier web having a low-adhesion surface,
(d) applying a pressure sensitive adhesive to said adhesion promoting primer and to said low-adhesion surface, which pressure sensitive adhesive is capable of forming a strong bond to a vulcanizable rubber article when the article is vulcanized in contact with the pressure sensitive adhesive,
(e) applying to the other surface of said backing a uniformly thick magnetizable layer, the thickness of which magnetizable layer is less than 50 micrometers, which comprises a major proportion by weight of magnetizable particles and a minor proportion of a polymeric binder and which has a remanent flux of at least 0.4 maxwells/cm of width so as to be useful as a magnetic recording layer, and
(f) winding the thus prepared backing into roll form.

11. A method according to claim 10, further comprising coating said magnetizable layer with a polymeric protective coating having a thickness in the range of 0.5 to 5.0 micrometers.

12. A method according to claim 10, further comprising the step of printing onto said label visible indicia characteristic of an intended use therefor.

13. The method according to claim 10, further comprising the step of coating onto said magnetizable layer, a tough thermosetting polymeric protective coating having a thickness in the range of 0.5 to 5.0 micrometers.

14. The method of making a roll of label tape suitable for providing vulcanizable rubber articles with label markings which become permanent after vulcanization and which are adapted for being unwound from roll form in condition for printing a magnetic code recorded thereon and applied to vulcanizable rubber articles whereupon during vulcanization the label becomes securely bonded to the article and subsequent to said vulcanization the recorded code may readily be detected, said method comprising the steps of
(a) providing a flexible, non-porous substantially uniformly thick backing of biaxially oriented polyethylene terephthalate, which has a thickness between the range of 10 to 100 micrometers, and which will withstand the vulcanization temperatures and pressures without appreciable dimensional change,
(b) applying to one surface of said backing an adhesive promoting primer comprising a solution of crude rubber and solvent therefor, drying said primer by evaporating the solvent therefrom, and improving the bond of said dried primer to said backing by exposure to UV light to provide a primer layer having a dry coating weight in the range of 0.1 to 3 grams/meter$^2$,
(c) applying to the exposed surface of said primer layer a solution of latex crepe and a suitable solvent therefor, and drying same to remove the solvent therefrom to provide a pressure sensitive adhesive layer having a dry coating weight ranging between 6 to 45 grams/meter$^2$,
(d) adhering a low-adhesion surface of the carrier web to said pressure sensitive adhesive layer,
(e) coating the opposite surface of said backing with a dispersion of a magnetic pigment, binder, crosslinking agents and suitable solvents, longitudinally orienting the magnetic pigment, and drying the magnetic dispersion to provide a layer of magnetic particles and binder having a thickness of less than 50 micrometers, which comprises a major proportion by weight of magnetizable particles and a minor proportion of a polymeric binder and which has a remanent flux of at least 0.4 maxwells per cm of width, and (f)
winding the thus prepared backing into roll form.

15. A printable label tape product which is capable of accepting printable indicia, of being recorded with a magnetic code and of being applied to a vulcanizable rubber article to provide thereon after vulcanization of said article protectively covered, permanent markings containing said magnetic code which may readily be detected and which is capable of being wound upon itself in roll form for storage and transport and of being unwound in condition for printing, magnetic encoding and application, said tape product comprising
a flexible temporary carrier web having a low-adhesion surface and adhered thereto a detachable label structure capable of withstanding vulcanization conditions present during molding operations, said label structure comprising a flexible, substantially uniformly thick backing of biaxially oriented polyethylene terephthalate having on one surface thereof an adhesion promoting primer, a pressure sensitive adhesive layer firmly adhered via said adhesion promoting primer to one surface of the backing and releasably adhered to said low adhesion surface, a magnetic recording layer secured to the other surface of the said backing and a protective printable outer layer firmly adhered to the outer surface of the magnetic recording layer.

16. A tape for labeling vulcanizable rubber articles such as vehicle tires, said tape comprising a flexible temporary carrier web having a low-adhesion surface and a detachable label adhered thereto, which label comprises (a) a flexible, non-porous substantially uniformly thick backing of biaxially oriented polyethylene terephthalate having a thickness within the range of 40 to 100 micrometers, and which will during molding operations withstand vulcanization temperatures and pressure without appreciable dimensional change, (b) an adhesion promoting primer of substantially uniform thickness on one surface of the backing, said primer having a dry coating weight within the range of 0.1 and 3 grams/meter$^2$, (c) a substantially uniformly thick layer of pressure sensitive adhesive, a major porportion of which consists of latex crepe, the dry coating weight of which is within the range of 6 to 45 grams/meter$^2$, permanently adhered via the adhesion promotion primer to the backing and releasably adhered to said low-adhesion surface of said carrier web, (d) a substantially uniformly thick magnetic recording layer secured to the other surface of the backing, which recording layer is less than 50 micrometers thick, comprises a major proportion by weight of acicular gamma-Fe$_2$O$_3$ particles and a minor proportion of a polymeric binder and has a remanent flux of at least 0.4 maxwells per cm of width, and (e) a protective coating comprising a tough thermoset polymer over the magnetic recording layer having a thickness in the range of 0.5 to 5.0 micrometers, said protective coating adapted to provide a printable ink receptive surface which is readily released from molds at the conclusion of vulcanization, the characteristics of said label enabling a magnetic code to be recorded thereon prior to the application thereof to a said vulcanizable rubber article such that it becomes securely bonded to the article during vulcanization, and further enabling the recorded magnetic code to be readily detected after vulcanization.

* * * * *